and also pro-ment of the invention wherein elements corresponding to
United States Patent Office 3,514,933
Patented June 2, 1970

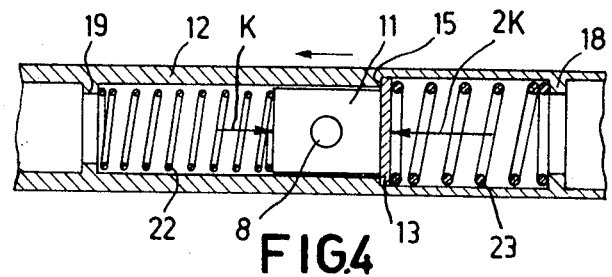
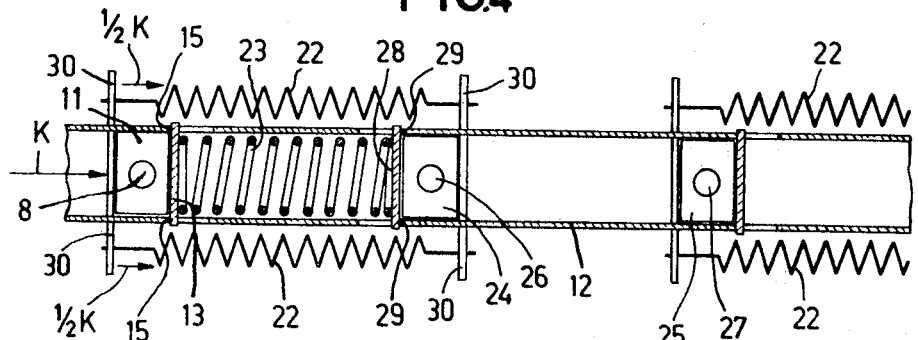
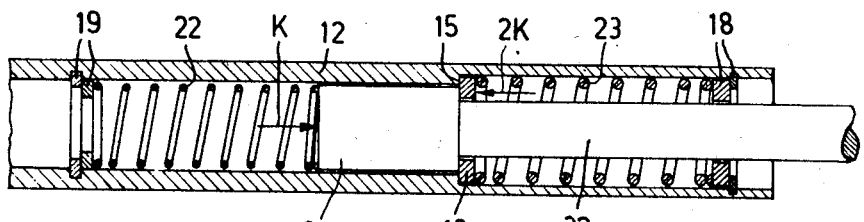
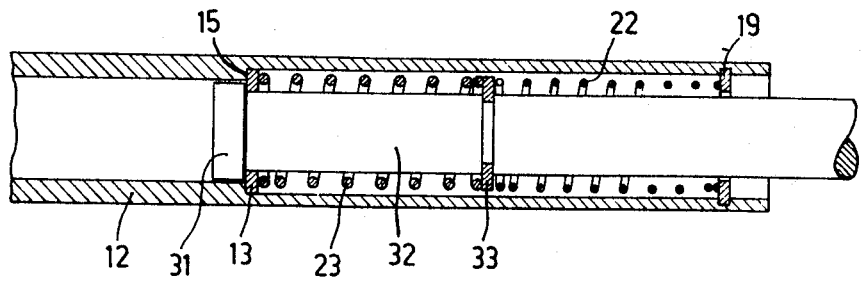

3,514,933
RECIPROCATING CUTTER MECHANISM
Alexandre Horowitz, Eindhoven, and Bernard Joseph Beusink, Oerle, Netherlands, assignors, by mesne assignments, to U.S. Philips Corporation, New York, N.Y., a corporation of Delaware
Filed May 3, 1967, Ser. No. 635,765
Claims priority, application Netherlands, May 11, 1966, 6606403
Int. Cl. A01d 55/26
U.S. Cl. 56—293                                    8 Claims

ABSTRACT OF THE DISCLOSURE

A protective device for a reciprocating cutter mechanism wherein a series of pivoting blades overlies a series of stationary blades to form a sickle bar cutter. Each of said pivotal blades is spring mounted on the drive bar such that if the pivoting motion of one or more pivoting blades is interrupted by engaging an obstruction the remaining blades will pivot while the spring mounting permits relative motion between the obstructed blades and the drive bar.

---

This invention relates to a protective device for pivoting blades of a cutter bar mechanism.

A problem involved with such tools is damage to the knives and other parts of a cutter mechanism due to the cutting members striking and wedgingly engaging hard objects, for example, a stone catching between the oscillating blades. It has been proposed to incorporate an overload protector, for example, fabricating the connecting-rod, attached to the moving blade partly of wood, wherein the wooden part fails at a predetermined load such that the connection between the driving and driven parts is interrupted. There are other known protective devices in which the maximum torque of the rotatable part of the drive mechanism is limited. It is also known to switch off the drive of a cutter bar automatically when the cutter bar collides with large obstacles. In one such device the cutter bar when subjected to abnormally heavy resistance is adapted to swing rearwardly, thereby uncoupling the drive. However, this latter type of protection fails when small hard objects get caught between the blades.

The invention has for its object to provide a simple, compact, easily incorporable protective device for cutter mechanisms which substantially reduces the aforesaid problems.

A further object of the invention is to provide an important improvement with respect to the known protective devices known hitherto involved so many problems on mechanically driven cutter mechanisms that hydraulically driven mowing machines were used instead, in which known hydraulic excess-pressure protecting devices could be easily incorporated.

It is an object of this invention to provide a cutter mechanism in which the maximum permissible force which can be exerted on a single blade by an obstructing object is far below the value of the normal driving force for all blades in common. With prior protective systems the maximum force permitted by the protective system had to be chosen above the normal driving force for all blades in common. In the event of blocking of a single blade, in spite of the protection provided by such a system, the blade could be subjected to forces likely to cause damage.

A further object of the invention is to provide a cutter mechanism in which other blades can operate normally, while one of them is temporarily blocked and also provide a pulsing force which will aid in ejecting the blocking object.

According to the invention a continuous oscillating cutting action by a cutting device is permitted while one or more of the cutting blades in restricted from movement. A driving element and a plurality of driven elements of the cutter mechanism are coupled by a set of springs and are guided so as to be movable in a translational path. The springs of each spring set engage a stop portion on the driving element and co-act with the driven element. During normal operation the driving force is transmitted to one of the driven elements by means of the springs. When one of the driven elements is subjected to an external force exceeding a predetermined value the spring will deflect and thereby permit an interruption of the motion of this driven element while the remaining driven elements and the driving element continue oscillating. In one embodiment of the invention the driving element is a reciprocating driving bar of a cutter mechanism and the driven element is a pivotal blade having one end mounted in a bearing block.

The invention will now be described in greater detail with reference to several embodiments thereof illustrated in the accompanying drawing, in which:

FIG. 4 shows a longitudinal sectional view of an alternative embodiment.

FIG. 5 shows a longitudinal sectional view of a further embodiment.

FIG. 6 is a longitudinal sectional view of a protective device in a driving bar of the connecting-rod type and FIG. 7 shows an alternative configuration of the embodiment of FIG. 6.

Figure 1:
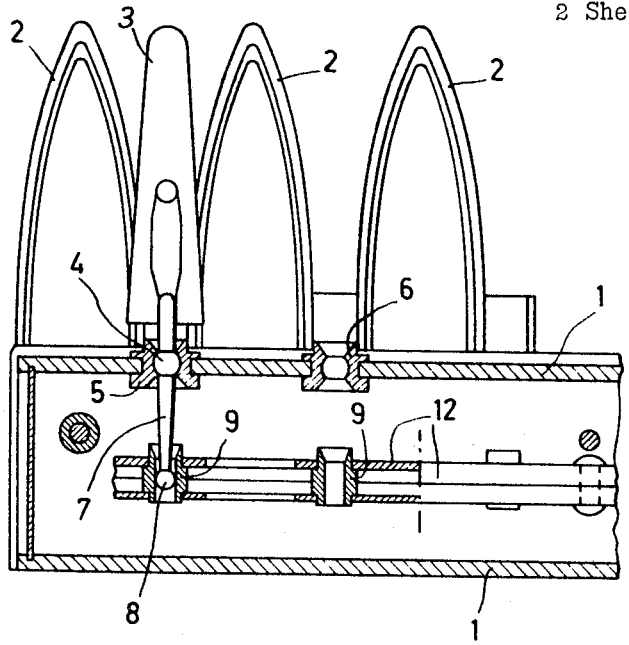
FIG. 1 is a sectional plan view of part of a cutter mechanism of the kind to which the invention can be applied with particular advantage.

Referring to FIG. 1, reference numeral 1 designates the elongated, box-shaped cutter bar casing, only the end part of which is shown. On the lower side of the cutter bar casing a row of stationary blades 2 is arranged. In the central plane between each pair of these blades, a blade 3 is arranged so as to be pivotable about a ball joint 4. Ball joint 4 is pivotally supported in an elastic seat 5 in the front wall of the casing 1. One of the pivotal blades 3 is shown, while the bearing 6 for the pivotal joint of an adjacent pivotal blade is also shown. Ball joint 4 forms part of the blade arm 7 of the blade 3. The drive link 8 also part of the blade arm is journalled in a sleeve-like bearing block 9 which, in this case, is stationary in the driving bar 10. The drive bar 12 is reciprocally displaceable in the casing 1. The drive thereof may be considered to be produced by an eccentric on a rotary driving shaft, journalled further to the right in the casing 1 (this shaft is not shown).

Figure 2:
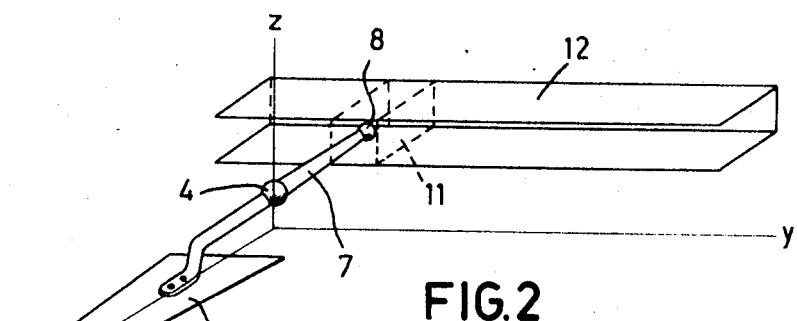
FIG. 2 shows a diagrammatic perspective view of one driven blade mounted in a bearing block arranged displaceably in a driving bar.

FIG. 2 shows diagrammatically the disposition of a pivotal blade 3 in the ball joint 4 on the driving arm 7. In this case the driving link 8 is journalled in a block 11, which itself is displaceable in the drive bar 12. The ball joint 4 is pivotally journalled in the cutter bar casing (not shown). Each of the pivotal blades 3 which constitute the row of blades on the cutter bar is connected in a similar manner with the cutter bar. The bearing blocks 11 are spaced apart from each other in a manner similar to that shown in FIG. 1.

Figure 3:
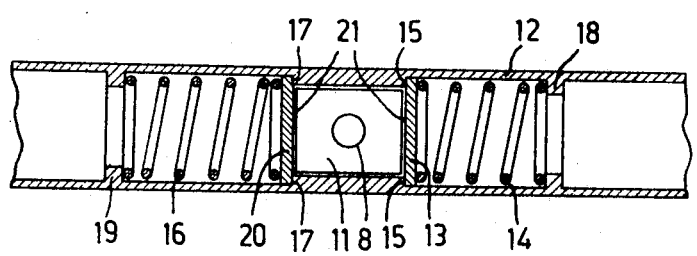
FIG. 3 is a sectional view along the longitudinal axis of a driving bar in which the spring locking of the bearing block is held by springs according to one embodiment of the invention.

FIG. 3 shows in the longitudinal section view an embodiment of the invention wherein elements corresponding to FIG. 2 are designated with the same reference numerals. A bearing block 11 in the driving bar 12 transfers a rapid oscillatory movement to the pivotal blade 3 shown in FIG. 2. The U-shaped profile of the bar 12 forms the driving bar and the bearing block 11 with the blade 3 is the driven portion. The bearing block 11 is guided by the profile of bar 12. During normal operation, the reciprocating drive bar 12 drives the block 11 and the pivotal blade 3. The bearing block 11 is interconnected with the drive bar by spring biased discs 13 and 20 respectively. The disc 13 is urged by a spring 14 against a stop 15 of the driving bar 12 and the disc 20 is urged by a spring 16 having the same spring constant and, producing the same force, against the stop 17. The springs bear on the supporting flanges 18 and 19 respectively in the driving bar 12. The two spring biased discs 13 and 20 deflect from the stops 15 and 17 respectively, when a force caused by obstruction of the pivotal blade 3 exceeds the value determined by the tension of the springs 14 and 16 respectively. The unobstructed blades will continue operating normally and, when the cause of obstruction is obviated the bearing block 11 will move back into the normal operating position by means of the springs 14 and 16 respectively.

In this embodiment pivotal blades 3 are employed, which have a cutting edge on both sides and cooperate with the cutting edges of the stationary blades 2 located on either side thereof, so that they are operative both in the forward and backward directions. In the event of an obstruction deflection of the bearing block 11 against spring pressure is possible in both directions. This two-directional protection is also found in the embodiments to be described hereinafter.

The embodiment of FIG. 3 permits a small amount of play due to the space 21, on either side of the bearing block 11 between the bearing block and the spring biased discs 13 and 20. Although this play may be extremely small and a lubricant may substantially mitigate the harmful effects, a certain amount of vibration during the reciprocating strokes is nevertheless unavoidable especially from wear after long use. However, the operation becomes less effective as the wear increases.

FIG. 4 shows an embodiment which obviates the vibration and wear problems. Corresponding parts are designated by the same reference numerals as in FIG. 3.

The movable bearing block 11 is urged in this case against the spring biased disc 13 in the direction of the possible deflection thereof by the force (K) of a spring 22, whereas the disc 13 is subjected to about double the force (2K) exerted by a heavier spring 23 operating in the direction towards the stop 15. Thus, in the two effective directions for movement, the block 11 will slide laterally in the driving bar 12, when the driving force K is exceeded by a blocking force created by the pivoting blades 3.

In the embodiment of FIG. 5 a special driving bar 12 for the simultaneous driving of a series of bilaterally operating pivotal blades which are connected to a number of bearing blocks 11, 24, 25 by the driving links 8, 26, 27 respectively, are shown. The blocks such as 11 and 24 are arranged to form a pair of blocks having a common set of springs. Between the two blocks 11 and 24 of one group, a pressure spring 23 exerting the force 2K, is located. The spring biased discs 13 and 28 bear on the stops 15 and 29, respectively, in the drive bar 12 and apply a biasing force in the direction towards the bearing blocks 11 and 24 respectively. The blocks 11 and 24 are capable of deflecting in both directions of motion. Two draw springs 22 (to be considered as a spring divided into two portions for balancing the drawing force) are connected on either side to the protruding profile portions 30 of the bearing blocks. Together they exert a pulling force K on the blocks 11 and 24 towards each other, said force amounting to half the tension of the interposed spring 23.

Considering the result of the effect on the block 11 with reference to the corresponding numerals for the relevant springs, discs and stops in FIGS. 4 and 5, it will be seen that a similar result is obtained as in FIG. 4, but with respect to the bearing blocks 11 and 24.

The embodiment of FIG. 5 provides not only a simplification since one set of springs provides protection for two bearing blocks 11 and 24. An additional advantage is obtained wherein the bearing blocks such as block 11 can be arranged near the end of the driving bar, because the springs are located on the inner side thereof. Moreover, a space in the driving bar between each pair of blocks is provided. In this case between the bearing blocks 24 and 25, a space is provided which may be used for accommodating fastening means for assembly of the driving bar and guide members, and at the center of the bar for the connection between the drive bar and the drive means, such as an eccentric arm.

FIG. 6 shows an arrangement similar to that of FIG. 4 wherein the same reference numerals are used for corresponding elements. The bearing block 11 of the last mentioned figure is formed in the shape of a plunger-like portion 31 connected to a rod element 32. A similar protection is thereby obtained for the driving mechanism which includes two portions 12 and 32.

FIG. 7 shows a variant of FIG. 6, between a shoulder 33 of the rod element 32 and the disc 13, bearing on the plunger-like portion 31 a spring 23 is tensioned to provide a force 2K.

The spring 22, bearing on the ring 19 of the portion 12, urges the disc 13 with a force K against the stop 15. The plunger-like portion 31 has to overcome this force K in order to be able to move to the right together with the disc 13.

For the movement to the left the shoulder 33 has to overcome the force 2K of the spring 23, in which the force K of the spring 22 contributes.

As in FIGS. 4 to 6, the driving forces are transmitted without play. During the continuation of the reciprocatory stroke of the driving portion in the event of an obstruction of block 31 only small vibrations occur, since during the reciprocatory stroke only a light-weight disc such as 13 is moved from the stop 15.

The above cited embodiments are intended as exemplary only, and while we have described our invention with a specific application and embodiment thereof, other modifications will be apparent to those skilled in the art.

What is claimed is:

1. A protective device for a reciprocating cutter mechanism of a mowing machine comprising: a longitudinal cutter bar, a plurality of fixed cutter blades mounted transversely on said cutter bar, a plurality of movable cutter blades interposed between said fixed blades and pivotally mounted on said cutter bar, reciprocating drive means within said cutter bar for engaging and simultaneously oscillating said movable blades in cooperation with the fixed blades so as to effectuate a cutting action therebetween, resilient protective means within said drive means and coacting with the movable blades for yieldingly permitting at least one of the movable blades to temporarily remain immovable without disengagement of said blade and said drive means and without discontinuing the simultaneous oscillating movement of the remaining blades, said resilient protective means further transmitting from said drive means a pulsing force to the temporarily immovable blades.

2. The device as claimed in claim 1 further including a blade arm attached at one end to a movable blade, a drive link formed at the other end of the blade arm, a drive bar mounted for reciprocal movement within the cutter bar, a bearing block slidably mounted within the drive bar for accommodating the drive link, and resilient means adjacent the bearing block for transmitting the reciprocating movement of the drive bar to the bearing block, said resilient means being deflectable to absorb said movement when the blade is immovable.

3. The device as claimed in claim 2 wherein the resilient means comprises spring members axially aligned and positioned within the drive bar on opposite sides of the bearing block, and disc members interposed between the spring members and the bearing block for providing a bearing surface for the spring members.

4. The device as claimed in claim 3 wherein the spring members comprise compression springs having equal spring constants.

5. The device as claimed in claim 3 wherein the spring members comprise first and second springs, the first spring having twice the spring constant of the second spring, and biased against one of said disc members, and the second spring being biased directly against the bearing block.

6. A device as claimed in claim 3 wherein the spring members comprise first and second springs, the first spring being positioned within the drive bar between two adjacent bearing blocks and the second spring being positioned externally of the drive bar and coacting with said two adjacent bearing blocks to exert a counterforce to said first spring.

7. The device as claimed in claim 5 further including a reciprocating rod element axially aligned within the drive bar, the bearing block being affixed to one end of the rod element, and the first spring being positioned around the rod element.

8. The device as claimed in claim 2 further including a reciprocating rod element axially aligned and positioned within the drive bar, resilient means comprising first and second springs positioned in tandem around the rod element, the bearing block being affixed to one end of the rod element, a shoulder portion in the rod element for separating the two springs such that the spring closest to the bearing block has a spring constant twice as large as the more remote spring.

References Cited

UNITED STATES PATENTS

| 1,604,726 | 10/1926 | Stauter | 56—293 |
| 2,793,488 | 5/1957 | Strohm | 56—293 |

FOREIGN PATENTS

| 741,660 | 9/1943 | Germany. |

ROBERT PESHOCK, Primary Examiner

J. N. ESKOVITZ, Assistant Examiner

U.S. Cl. X.R.

56—298